2 Sheets--Sheet 1.
M. JOHNSON.
Potato-Diggers.
No. 146,908. Patented Jan. 27, 1874.
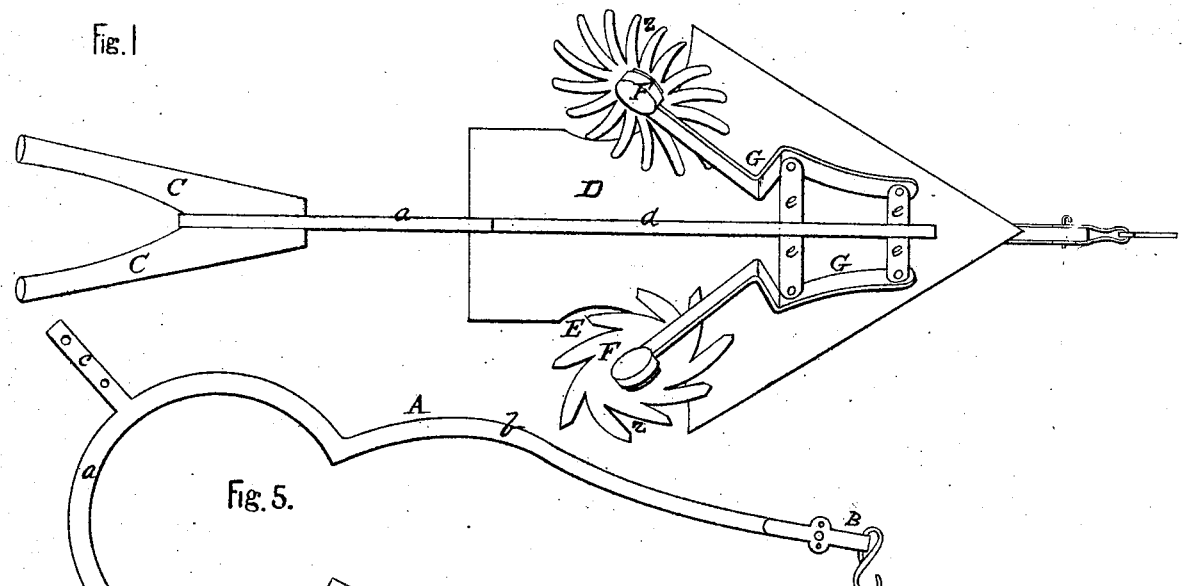
Fig. 1
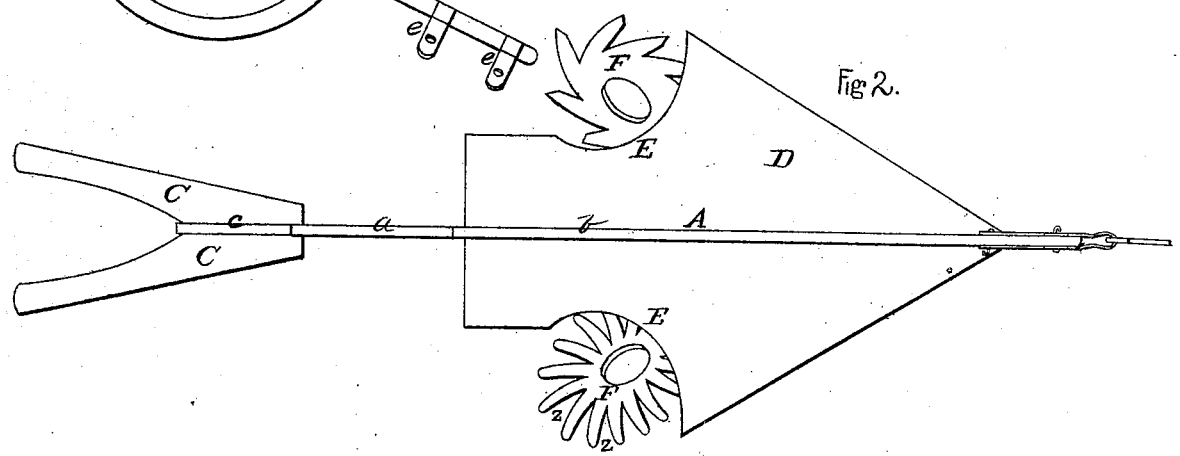
Fig. 5.
Fig. 2.
WITNESSES.
Chas. F. Steele
Phil. C. Hass
INVENTOR.
Moses Johnson
Chipman Hosmer & Co
attys.

2 Sheets--Sheet 2.

M. JOHNSON.
Potato-Diggers.

No. 146,908. Patented Jan. 27, 1874.

WITNESSES.
Cha. F. Steele
Phil C. Chase

INVENTOR.
Moses Johnson
Chipman Hosmer & Co
Attys.

UNITED STATES PATENT OFFICE.

MOSES JOHNSON, OF THREE RIVERS, MICHIGAN.

IMPROVEMENT IN POTATO-DIGGERS.

Specification forming part of Letters Patent No. 146,908, dated January 27, 1874; application filed January 10, 1874.

*To all whom it may concern:*

Be it known that I, MOSES JOHNSON, of Three Rivers, in the county of St. Joseph and State of Michigan, have invented a new and valuable Improvement in Potato-Diggers; and I do hereby declare that the following is a full, clear, and exact description of the construction and operation of the same, reference being had to the annexed drawings making a part of this specification, and to the letters and figures of reference marked thereon.

Figure 3:
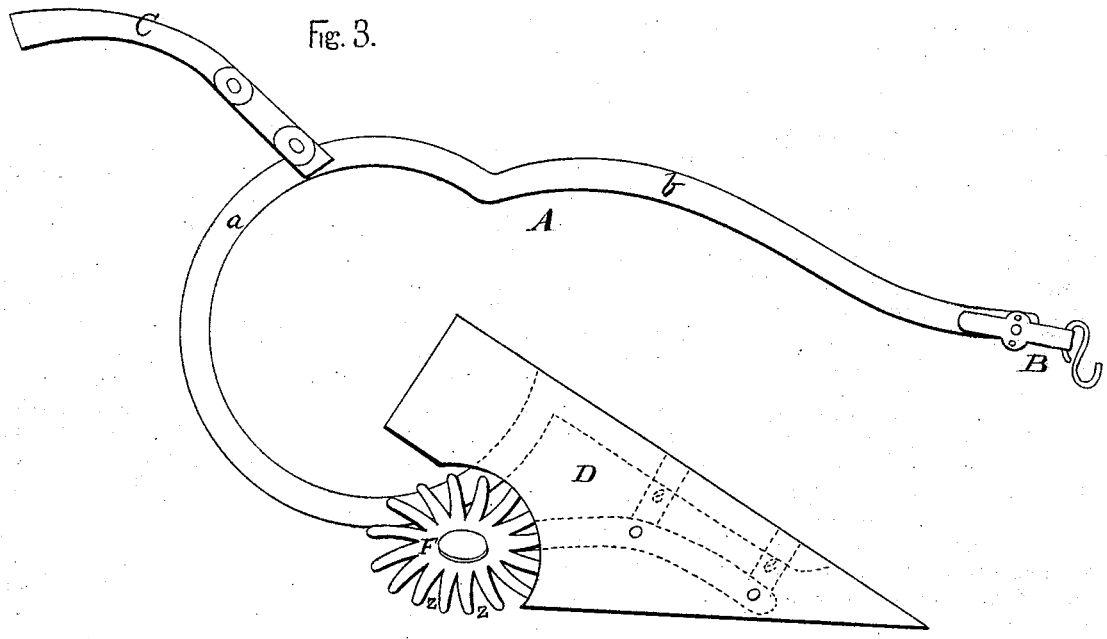
Figure 4:
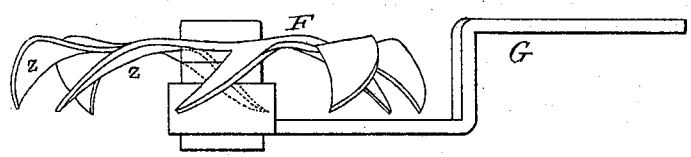
Figure 6:
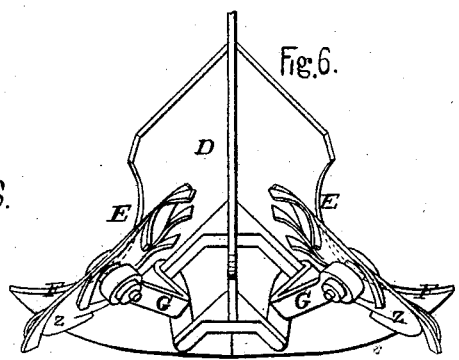

Figure 1 of the drawings is a bottom view of my potato-digger. Fig. 2 is a top view of same. Fig. 3 is a side view of same. Figs. 4, 5, and 6 are details of same.

This invention has relation to potato-diggers; and it consists in the construction and novel arrangement of the draft-beam, the shovel, and the sifting-wheels, all as hereinafter more fully described. The object of this invention is to provide a simple and efficient device for lifting the potatoes out of the ground and for sifting the soil therefrom. It can also be used with advantage as a shovel-plow.

In the accompanying drawings, the letter A designates the draft-beam. This is usually of metal, cast with its rear portion, *a*, in the form of three-quarters of a circle, the beam *b* being carried forward from the upper end thereof in the usual curved form, and provided at its end with a clevis, B. The rear bend of the circular portion is provided with a lug or arm, *c*, to which the handles C are secured. The lower end of the circular portion is provided, also, with a forward extension, *d*, having ears *e*, which serve for the attachment of the shovel and the arms of the sifting-wheels. The shovel D, tapering or angular in form, is bent upward to form a central ridge from point to heel, the wings on each side of the shaft being slightly concave. The lower corners of the rear end of the shovel are circularly notched or cut away, as shown in the drawings at E, in order to make room for and expose the shakers or sifting-wheels F. The central or ribbed portion of the shovel extends back over the upper and rear portions of the sifting-wheels, in order to guard against the falling of clods or obstructions between the upper portion of said wheels, whereby their turning would be prevented. The sifting-wheels F are inclined in position, their planes of inclination being parallel, or nearly so, with the wings of the shovel. Each wheel is provided with a number of radial or curved arms or fingers, *z*, arranged about its periphery, and extending outward therefrom. These arms or fingers may be bent downward, and may have a slight twist given to each, for the purpose of effectively breaking up the clods of the soil lifted by the shovel. The central or entire portion of each wheel may be made convex. These wheels are journaled upon the ends of the arms G, which are secured to the under side of the shovel on each side of the extension *d*, and to the lugs *e* of said extension. The wheels are located at and under the rear lower corners of the shovel in such a manner that the curved corner spaces E are immediately above and outside of said wheels, as indicated in the drawings. The outer edges of riddler-wheels are designed to rest on the ground, the upper fingers passing under the central or ridged portion of the shovel, and being guarded thereby from seizing the potato-tops or other obstructions.

What I claim as new, and desire to secure by Letters Patent, is—

The potato-digger consisting of the draft-beam having the extensions *b* and *d*, the angular ridged shovel D, having the corner notches E, the journal-arms G, and the inclined sifting-wheels having the peripheral fingers *z*, all arranged substantially as specified.

In testimony that I claim the above I have hereunto subscribed my name in the presence of two witnesses.

MOSES JOHNSON.

Witnesses:
R. R. PEALER,
PETER HOATZ.